United States Patent [19]

Bjorklund

[11] 4,306,771
[45] Dec. 22, 1981

[54] OPTICAL PULSE SHAPING DEVICE AND METHOD

[75] Inventor: Gary C. Bjorklund, Los Altos, Calif.

[73] Assignee: International Business Machines Corporation, Armonk, N.Y.

[21] Appl. No.: 153,472

[22] Filed: May 27, 1980

[51] Int. Cl.³ .............................................. G02B 5/22
[52] U.S. Cl. ............................... 350/311; 350/162 SF
[58] Field of Search .................. 365/119; 331/94.5 M, 331/94.5 ML, 94.5 C; 332/7.51; 350/311, 162 SF

[56] References Cited

U.S. PATENT DOCUMENTS

| | | | |
|---|---|---|---|
| 3,675,154 | 7/1972 | Duguay et al. | 331/94.5 T |
| 3,679,313 | 7/1972 | Rosenberg | 331/94.5 C X |
| 3,696,310 | 10/1972 | Paoli et al. | 331/94.5 M |
| 3,720,884 | 3/1973 | Kelley et al. | 331/94.5 C |
| 3,774,121 | 11/1973 | Ashkin et al. | 331/94.5 M |
| 3,879,109 | 4/1975 | Thomas | 350/174 |
| 3,999,839 | 12/1976 | Bjorklund et al. | 260/314.5 |
| 4,101,976 | 7/1978 | Castro et al. | 365/119 |

OTHER PUBLICATIONS

Gires, et al., "Interféromètre Utilisable Poor la Compression d'Impulsions Lumineuses Modulées en Fréquence", C. R. ACAD. SC. Paris, t. 258, (22 Jun. 1964), pp. 6112-6115.

Duguay, M. A. et al., "Compression of Pulses from a Mode-Locked He-Ne Laser", Applied Physics Letters, vol. 14, No. 1, 1 Jan. 1969, pp. 14-16.

Grischkowsky, D. "Optical Pulse Compression", Applied Physics Lett, vol. 25, No. 10, pp. 566-568, 15 Nov. 1974.

Glordmaine, J. A. et al., "Compression of Optical Pulses", IEEE Journal of Quantum Electronics, pp. 252-255, May 1968.

Treacy, E. B., "Optical Pulse Compression with Diffraction Gratings", IEEE Journal of Quantum Electronics, vol. QE5, No. 9, Sep. 1969, pp. 454-458.

Primary Examiner—William L. Sikes
Attorney, Agent, or Firm—Joseph E. Kieninger

[57] ABSTRACT

An optical pulse shaping device and methhod of shaping an optical pulse involves the use of a phase coherent multi-frequency light beam with an optical element consisting of a sample containing an absorption band with multiple holes. The holes are burned into the sample to selected depths at selected frequency locations, thereby permitting the relative phases and amplitudes of the input frequency components of the beam to be independently varied to arbitrary values. This system enables a generalized Fourier synthesis of optical pulses such as a laser with designed temporal profiles to be effected.

7 Claims, 4 Drawing Figures

OPTICAL PULSE SHAPING DEVICE AND METHOD

TECHNICAL FIELD

This invention relates to optical pulses, and more particularly to the Fourier synthesis of optical pulses with arbitrary temporal profiles.

It is a primary object of this invention to provide an improved method of and system for shaping optical pulses.

It is another object of this invention to provide a method for and system of providing an arbitrary transfer function for generalized Fourier synthesis of optical pulses.

It is still another object of this invention to provide a method of and system for providing pulse temporal profiles with useful shapes.

It is yet still another object of this invention to provide a method of and system for providing pulses that are shorter than those produced by conventional mode locking.

It is a further object of this invention to provide a method for and system of providing trains of short pulses from continuous wave laser beams with no loss in average power.

DESCRIPTION OF THE PRIOR ART

The production of laser pulses from multi-frequency input laser beams has been studied extensively. The multi-frequency input laser beams have been passed through dispersive elements such as an interferometer, diffraction grating pair and a dispersive material. With these types of dispersive elements, the phase and amplitude modifications introduced to the input frequency components are slowly and monotonically varying over the spectral range of the input beam. As a result, the amplitudes and phases of the individual input frequency components cannot be independently varied and a generalized Fourier synthesis of arbitrary pulse shapes is not possible. These methods are capable of pulse compression without the control of the compressed pulse shape.

The use of a sample with periodic resonances with multi-frequency input laser beams provides a transfer function which is strictly periodic in the frequency domain. This limits the scope of the individual phase and amplitude control which can be achieved for each laser frequency component. This is described in the patent to Rosenberg, U.S. Pat. No. 3,679,313 and the patent to Bjorklund, U.S. Pat. No. 3,999,839.

The patent to Thomas, U.S. Pat. No. 3,879,109, involves a large number of mechanical elements and by brute force performs a degree of pulse shaping. The patent to Kelley, U.S. Pat. No. 3,720,884 describes pulse compression using a very restricted form of fourier synthesis. This device is capable of producing very short pulses, but with no control of the pulse shape.

BRIEF DESCRIPTION OF THE DRAWINGS

In the accompanying drawings forming a material part of this disclosure.

DISCLOSURE OF THE INVENTION

For a further understanding of the invention and of the objects and advantages thereof, reference will be had to the following description and accompanying drawing and to the appended claims in which the various novel features of the invention are more particularly set forth.

An optical pulse shaping device and method of shaping an optical pulse involves the use of a phase coherent multi-frequency light source beam with a novel optical element consisting of a sample containing an absorption band with multiple holes. A mode locked laser or a single frequency laser passed through a phase or amplitude modulator are two examples of such light source input beams. The laser needs to have frequency components which maintain a relative constant relative amplitude and phase. The holes are burned into the sample to selected depths at selected frequency locations, thereby permitting the relative phase and amplitudes of the input frequency components of the laser to be independently varied to arbitrary values. This system enables a generalized Fourier synthesis of optical pulses with designed temporal profiles to be effected.

Fourier synthesis involves the use of a component with a selected transfer function in the frequency domain, i.e. filtering and phase shifting, so as to alter in a controlled way the frequency domain spectrum of an input signal to the component to produce in the time domain a desired output waveform.

BEST MODE FOR CARRYING OUT THE INVENTION

Figure 1:
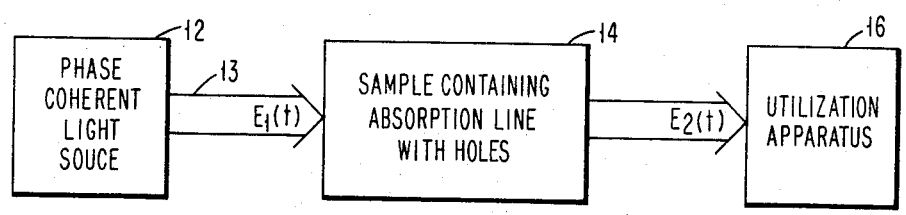
FIG. 1 is a schematic view of the system in accordance with this invention.

As shown in FIG. 1, a phase coherent light source 12 produces a beam 13 that is passed into a sample 14. A preferred embodiment for the light source 12 is the multi-frequency laser beam whose frequency components each maintain a constant relative amplitude and phase. Such a laser beam can be obtained by directly utilizing the raw output of a mode locked laser or by passing a single frequency laser beam through an amplitude or phase modulator driven by a periodic waveform. The sample 14 is a material that contains a strong inhomogeneous optical absorption band that has a number of holes burned therein at carefully selected locations and depths. The material in sample 14 may be any hole-burning material such as those described in the patent to Castro, U.S. Pat. No. 4,101,976 which is incorporated herein by reference thereto. Examples of such materials are the free-base porphyrin, $H_2p$ in a certain matrix, tetrazine, dedeuterated porphyrin analog, $D_2p$, phtalocyanine, tetraphenyl porphyrin and the $F_3^+$ color centers in NaF. Any material which exhibits an inhomogeneous broadened zero phonon absorption line and undergoes a photoinduced reaction upon exposure to light may be used in the practice of this invention.

When the multi-frequency laser beam 13 is passed through the sample 14, the emerging laser beam has a temporal structure consisting of a train of identical pulses with the desired temporal profile, that is, pulse shape in time. The laser beam emerging from a sample 14 is then utilized by apparatus 16. Examples of this type of apparatus 16 are an optical fiber, a light activated electrical switch, a light switched Josephson junction or a laser fusion target. This invention is not limited to any particular type of apparatus which uses the laser pulse that has been shaped by passing through the sample 14.

The generalized Fourier synthesis of the incident multi-frequency laser beam is achieved by deliberately utilizing the modified optical properties of the inhomogeneous absorption band containing holes in the material 14 to introduce arbitrary and controllable changes in the relative phases and amplitudes of the frequency components of the multi-frequency laser beam 13.

Figure 2:
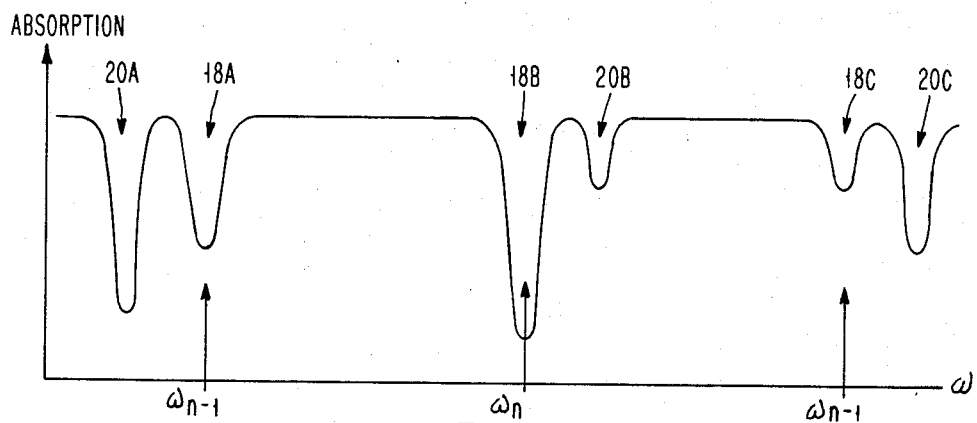
FIG. 2 illustrates the relative positions of holes and laser frequency components.

In FIG. 2, the relative positions of the holes in the sample 14 are shown together with three of the laser frequency components, $\omega_{n-1}$, $\omega_n$ and $\omega_{n+1}$ where $\omega$, the angular frequency, is equal to $2\pi\nu$ where $\nu$ is the frequency. Each frequency component $\omega_{n-1}$, $\omega_n$ and $\omega_{n+1}$ would be associated with two holes, 18A and 20A, 18B and 20B and 18C and 20C respectively. One hole, 18B, has a center frequency exactly equal to $\omega_n$ and its depth would control the amplitude of the frequency component at $\omega_n$. The other hole, 20B, would be offset several hole widths from $\omega_n$. The depth of hole 20B would control the magnitude of the phase shift at $\omega_n$ and the sign of the phase shift is controlled by the direction of the offset. For example, for frequency component $\omega_{n-1}$, the sign of the phase shift is controlled by the direction of the offset of hole 20A which is to left of hole 18A as shown in FIG. 2.

Figure 3:
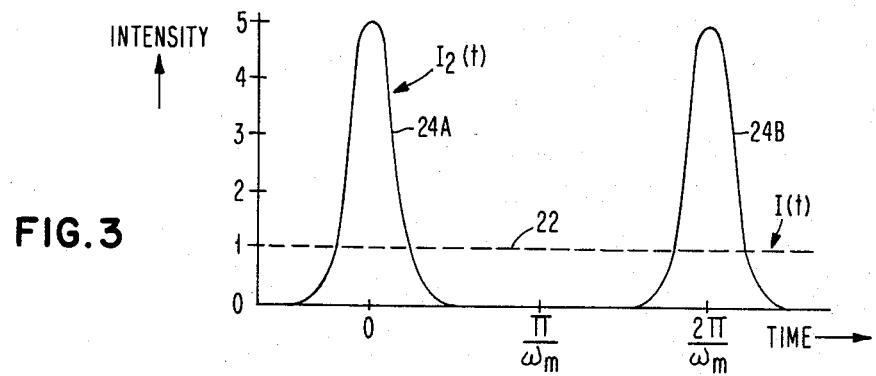
FIG. 3 illustrates one embodiment of pulse shaping.

An example of the pulse shaping done with device 14 is shown in FIG. 3. A single frequency laser beam is passed through a sinusoidally driven phase modulator with a modulation index of 1.5 to yield a multi-frequency laser beam. As is true for pure phase modulation at any modulation index, the slowly varying envelope intensity, I(t), of the multi-frequency laser beam is a constant represented by the dashed curve 22 in FIG. 3.

The slowly varying envelope intensity of the beam emerging from sample 14 is no longer constant in time, but takes the form of a train of clean and sharp pulses of duration T/5, period T, and the peak intensity $5I_1$ where T is the period of the sinusoidal phase modulation. In this case, T equals the pulse interval equals $2\pi/\omega_m$.

Figure 4:
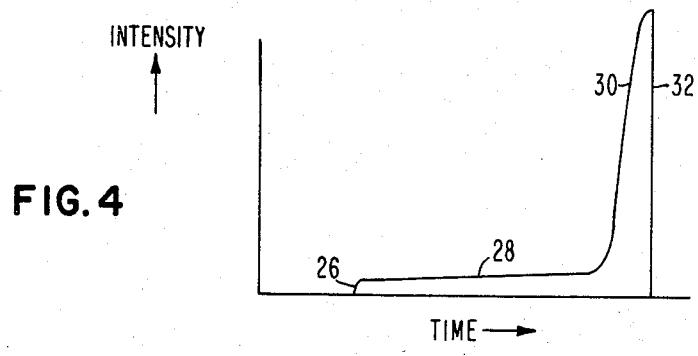
FIG. 4 illustrates a second embodiment of pulse shaping.

The Fourier synthesis of pulses in accordance with this invention is quite general and as a result, pulse temporal profiles with virtually any shape may be produced. For example, many laser fusion applications require an asymmetric pulse shape with a low intensity initial pedestal several nanoseconds long followed by a high intensity main pulse of 100 picosecond duration as shown in FIG. 4. In this example, the pulse shape has an initial rise 26 followed by a pedestal portion 28, a leading edge portion 30 and a trailing edge 32. The flexibility of this method and system is virtually limitless, and an infinite number of shapes may be obtained by the proper position and depth of the holes in the sample material 14.

The invention has described a laser with a broadened frequency spectrum which maintains constant relative amplitude and phase as a preferred input source. The invention also includes a collimated incoherent light source with an optical band width less than a hole width that is passed through a phase or amplitude modulator as an input source. Another input source may be a finite bandwidth laser source with an optical band width less than a hole width that is passed through a phase or amplitude modulator.

Another advantage of this device and method is that pulses can be produced which are shorter than those which can be produced by direct modelocking. The minimum pulse duration which can be achieved by direct modelocking is always limited to the inverse of the laser gain profile bandwidth. However, by utilizing an external modulator to produce the multiple input laser frequencies and then performing the Fourier synthesis in accordance with this invention, much shorter pulses can be produced with duration limited only by the inverse of the bandwidth spanned by the multi-frequency laser beam. A further advantage is that, by utilizing pure phase modulation to produce the multiple input frequencies, and by manipulating only the relative phases of these components to achieve a partial Fourier synthesis, trains of short pulses may be formed from laser beams with no loss in average power.

While I have illustrated and described a preferred embodiment of my invention, it is understood that I do not limit myself to the precise constructions herein and the right is reserved to all changes and modifications coming within the scope of the invention as defined in the appended claims.

I claim:

1. A method of forming optical pulses having a designed pulse shape in time comprising the steps of:
    passing a phase coherent multi-frequency light source beam through a material containing a broad inhomogeneous absorption band containing a plurality of holes of a preselected depth at preselected frequency locations whereby the amplitude and phase of each optical frequency component are adjusted by the preselected holes in the material.

2. A method of forming optical pulses having a designed pulse shape in time comprising the steps of:
    providing a phase coherent multi-frequency light source beam, and
    passing said beam through a material containing a broad inhomogeneous absorption band containing a plurality of holes of a preselected depth at preselected frequency locations whereby the amplitude and phase of each optical frequency component are adjusted by the preselected holes in the material.

3. A method as described in claim 2 whereby said light source beam is provided by a modelocked laser.

4. A method as described in claim 2 whereby said light source beam is provided by passing a single frequency laser through a periodically driven modulator.

5. A method as described in claim 2 whereby said light source beam is provided by a finite bandwidth laser source with an optical bandwidth less than a hole width that is passed through a periodically driven modulator.

6. A method as described in claim 2 whereby said light source beam is provided by a collimated incoherent light source with an optical bandwidth less than a hole width that is passed through a periodically driven modulator.

7. An optical pulse shaping device comprising:
    a material containing a broad inhomogeneous absorption band containing a plurality of holes of a preselected depth at preselected locations wherein the passage therethrough of a phase coherent multi-frequency light source beam will adjust the amplitude and phase of each optical frequency component that passes through one of said holes, and
    means to provide a phase coherent multi-frequency light source beam.

* * * * *